US011417120B2

(12) United States Patent
Kim et al.

(10) Patent No.: US 11,417,120 B2
(45) Date of Patent: Aug. 16, 2022

(54) VEHICLE WHICH INDICATES PASSENGER MOVABILITY, AND METHOD FOR CONTROLLING THE SAME

(71) Applicants: Hyundai Motor Company, Seoul (KR); Kia Motors Corporation, Seoul (KR)

(72) Inventors: Donghyuk Kim, Hwaseong-si (KR); Ilhwan Kim, Hwaseong-si (KR); Sangyeob Lee, Seongnam-si (KR); Kyung-Joo Bang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 492 days.

(21) Appl. No.: 16/686,660

(22) Filed: Nov. 18, 2019

(65) Prior Publication Data

US 2020/0380278 A1 Dec. 3, 2020

(30) Foreign Application Priority Data

May 27, 2019 (KR) ........................ 10-2019-0061714

(51) Int. Cl.

| | |
|---|---|
| ***B60Q 9/00*** | (2006.01) |
| ***G06T 7/70*** | (2017.01) |
| ***G06V 40/20*** | (2022.01) |
| ***G06V 20/59*** | (2022.01) |
| ***G08G 1/01*** | (2006.01) |
| ***B60R 11/04*** | (2006.01) |
| *B60R 11/00* | (2006.01) |
| *G05D 1/02* | (2020.01) |

(52) U.S. Cl.

CPC ............... *G06V 20/59* (2022.01); *B60Q 9/00* (2013.01); *B60R 11/04* (2013.01); *G06T 7/70* (2017.01); *G06V 40/20* (2022.01); *G08G 1/0125* (2013.01); *B60R 2011/0003* (2013.01); *G05D 1/0212* (2013.01); *G05D 2201/0213* (2013.01); *G06T 2207/30268* (2013.01)

(58) Field of Classification Search

CPC .......... G06V 20/59; G06V 40/20; G06T 7/70; G06T 2207/30268; B60Q 9/00; B60R 11/04; B60R 2011/0003; G08G 1/0125; G05D 1/0212; G05D 2201/0213

See application file for complete search history.

(56) References Cited

FOREIGN PATENT DOCUMENTS

KR 10-2017-0099818 A 9/2017

*Primary Examiner* — Mathew Franklin Gordon

(74) *Attorney, Agent, or Firm* — Morgan, Lewis & Bockius LLP

(57) ABSTRACT

A vehicle includes: a camera configured to acquire position information of a passenger of the vehicle by capturing the passenger; an indicator configured to indicate whether the passenger is movable within the vehicle; and a processor. The processor may determine behavioral stability of the passenger based on the acquired position information of the passenger, determine whether the passenger is movable within the vehicle based on the determined behavioral stability and driving environment of the vehicle; and control an indication type of the indicator differently depend on whether the passenger is movable.

20 Claims, 12 Drawing Sheets

VEHICLE WHICH INDICATES PASSENGER MOVABILITY, AND METHOD FOR CONTROLLING THE SAME

CROSS-REFERENCE TO RELATED APPLICATION(S)

This application is based on and claims priority to Korean Patent Application No. 10-2019-0061714, filed on May 27, 2019 in the Korean Intellectual Property Office, the disclosure of which is incorporated by reference in its entirety.

TECHNICAL FIELD

The disclosure relates to a vehicle and a method for controlling the vehicle, and more particularly, to an autonomous vehicle capable of informing a point in time at which a passenger in the autonomous vehicle is movable while driving the autonomous vehicle, and a method for controlling the autonomous vehicle.

BACKGROUND

In general, an autonomous vehicle (also called an unmanned vehicle) refers to a vehicle that can autonomously drive to a set destination by monitoring external information and grasping road conditions without manipulation by a driver.

A control system of the autonomous vehicle recognizes a lane using a camera and performs automatic steering. The control system can detect a lane width, a transverse position of the vehicle in the lane, a distance to both lanes and a shape of the lane, and the radius of curvature of a road, based on image processing of the camera. The control system estimates the driving trajectory of the vehicle by using information on the position and the road, and changes the lane along the estimated driving trajectory.

The autonomous vehicle basically follows a map-based driving route. However, when there is a variable such as an obstacle in the driving route, the autonomous vehicle controls components of the vehicle so that the vehicle can safely drive by changing the driving route in real time. Vehicle control technology is being proposed that can completely autonomously drive on highway by using sensors, motors and artificial intelligence, without a human. The autonomous vehicle can perform a complete autonomous driving by recognizing the surrounding environment three-dimensionally using sensors and combining communication technology, artificial intelligence technology and control technology of an actuator such as motors.

This autonomous vehicle is used to transport a number of personnel such as a bus or a van. The autonomous vehicle with a large number of personnel needs to ensure the safety of passengers on board. Recently, there is an increasing need for research into devices and methods for securing the safety of the passengers aboard in response to the driving routes and driving conditions of the autonomous vehicles.

SUMMARY

An aspect of the present disclosure is to provide an autonomous vehicle capable of ensuring the safety of the passengers by notifying the time at which the passengers of the autonomous vehicle can move while the autonomous vehicle is driving, and a method for controlling the autonomous vehicle.

Additional aspects of the present disclosure will be set forth in part in the description which follows and, in part, will be obvious from the description, or may be learned by practice of the disclosure.

In accordance with an aspect of the present disclosure, a vehicle may include: a camera configured to acquire position information of a passenger of the vehicle by capturing the passenger; an indicator configured to indicate whether the passenger is movable within the vehicle; and a processor. The processor may determine behavioral stability of the passenger based on the acquired position information of the passenger, determine whether the passenger is movable within the vehicle based on the determined behavioral stability and driving environment of the vehicle; and control an indication type of the indicator differently depending on whether the passenger is movable.

The processor may determine the behavioral stability of the passenger as the first condition higher than a predetermined reference when it is determined that the passenger is seated in a bus based on the position information and the shape information of the passenger, and determine the behavioral stability of the passenger as a second condition lower than the predetermined reference when it is determined that the passenger is standing in the bus.

The driving environment of the vehicle may include at least one of a driving route of the vehicle, a driving speed of the vehicle, climatic conditions at the time the vehicle is driving or state information of a road on which the vehicle is driving. The vehicle further includes: a storage configured to store map information including the driving route on which the vehicle is to be driving and the state information of the road on which the vehicle is to be driving, and information on the driving route acquired in real time while the vehicle is driving; and a speed sensor configured to detect the driving speed of the vehicle.

The controller may control the indicator to be indicated in a first color when it is determined that the behavioral stability of the passenger is the first condition and that the passenger is movable within the vehicle based on the driving environment of the vehicle.

The controller may control the indicator to be indicated in a second color when it is determined that the behavioral stability of the passenger is the first condition and that the passenger is not movable within the vehicle based on the driving environment of the vehicle.

The controller may control the indicator to be indicated in a first color when it is determined that the behavioral stability of the passenger is the second condition and that the passenger is movable within the vehicle based on the driving environment of the vehicle.

The controller may control the indicator to be indicated in a third color when it is determined that the behavioral stability of the passenger is the second condition and that the passenger is not movable within the vehicle based on the driving environment of the vehicle.

The controller may determine whether the driving route of the vehicle can be changed based on the map information and congestion degree of the road on which the vehicle is driving when it is determined that the behavioral stability of the passenger is the second condition and that the passenger is not movable within the vehicle based on the driving environment of the vehicle.

The controller may control the vehicle to drive on the changed driving route when the driving route of the vehicle can be changed, and control the indicator to be indicated in a third color when the driving route of the vehicle cannot be changed.

The vehicle further includes a detection sensor configured to detect an object located around the vehicle. The controller is configured to determine the congestion degree of the road on which the vehicle is driving based on at least one of position information or speed information of the object acquired by the detection sensor.

In accordance with another aspect of the present disclosure, a method for controlling a vehicle, which comprises an indicator for indicating whether a passenger of the vehicle is movable within the vehicle, includes: acquiring position information of the passenger by capturing the passenger; determining behavioral stability of the passenger based on the acquired position information of the passenger; determining whether the passenger is movable within the vehicle based on the determined behavioral stability and driving environment of the vehicle; and controlling an indication type of the indicator differently depending on whether the passenger is movable.

The determining of the behavioral stability of the passenger may include determining the behavioral stability of the passenger as a first condition higher than a predetermined reference when it is determined that the passenger is seated in a bus based on the position information and shape information of the passenger, and determining the behavioral stability of the passenger as a second condition lower than the predetermined reference when it is determined that the passenger is standing in the bus.

The driving environment of the vehicle includes at least one of a driving route of the vehicle, a driving speed of the vehicle, climatic conditions at the time the vehicle is driving, or state information of a road on which the vehicle is driving. The method may further include: storing map information including the driving route on which the vehicle is to be driving and state information of the road on which the vehicle is to be driving, and information on the driving route acquired in real time while the vehicle is driving; and detecting the driving speed of the vehicle.

The controlling of the indication type of the indicator may include controlling the indicator to be indicated in a first color when it is determined that the behavioral stability of the passenger is the first condition and that the passenger is movable within the vehicle based on the driving environment of the vehicle.

The controlling of the indication type of the indicator may include controlling the indicator to be indicated in a second color when it is determined that the behavioral stability of the passenger is the first condition and that the passenger is not movable within the vehicle based on the driving environment of the vehicle.

The controlling of the indication type of the indicator may include controlling the indicator to be indicated in a first color when it is determined that the behavioral stability of the passenger is the second condition and that the passenger is movable within the vehicle based on the driving environment of the vehicle.

The controlling of the indication type of the indicator may include controlling the indicator to be indicated in a third color when it is determined that the behavioral stability of the passenger is the second condition and that the passenger is not movable within the vehicle based on the driving environment of the vehicle.

The method may further include determining whether the driving route of the vehicle can be changed based on the map information and congestion degree of the road on which the vehicle is driving when it is determined that the behavioral stability of the passenger is the second condition and that the passenger is not movable within the vehicle based on the driving environment of the vehicle.

The method may further include controlling the vehicle to drive on the changed driving route when the driving route of the vehicle can be changed, and controlling the indicator to be indicated in a third color when the driving route of the vehicle cannot be changed.

The method may further include detecting an object located around the vehicle; and determining the congestion degree of the road on which the vehicle is driving based on at least one of position information or speed information of the object.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
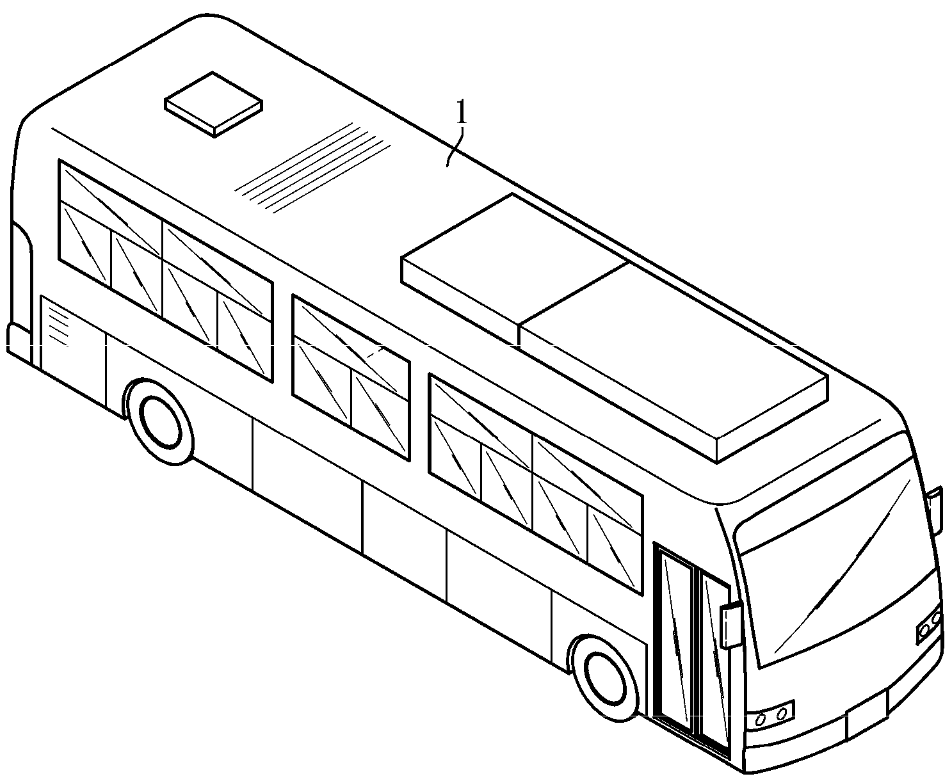
FIG. 1 is an external view illustrating a general autonomous bus.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

When a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 is an external view illustrating a general autonomous bus.

As illustrated in FIG. 1, a vehicle and a method for controlling the same according to an exemplary embodiment of the disclosure will be described taking a bus 1 as an example. However, the vehicle according to exemplary embodiments of the disclosure may be a vehicle of a different type than the bus.

The vehicle according to exemplary embodiments of the disclosure will be described by taking an example of an autonomous driving bus that drives itself to the destination without the operation of a vehicle driver.

The autonomous driving bus performs autonomous driving with a large number of passengers on board. In some cases, the bus 1 may be shaken or the driving stability may be lowered depending on an autonomous driving route and the driving environment. In this case, when the passengers on the bus 1 move within the bus 1 for changing the seats or getting off, accidents may occur, such as falling down or hitting a structure inside the bus.

According to the vehicle and the method for controlling the same according to embodiments of the disclosure, the behavioral stability of the passenger is determined according to position information of the passenger of the bus 1, and the passenger is provided with an indication indicating whether the passenger can move within the bus based on the driving environment of the bus 1. Therefore, the passenger may determine whether he or she can currently move within the vehicle by checking the indication.

Figure 2:
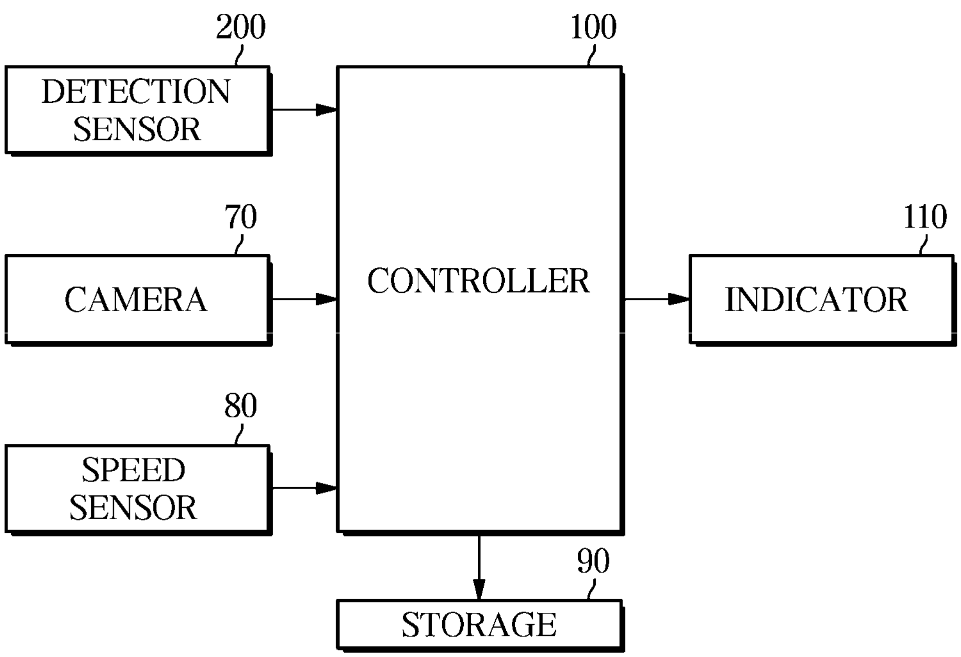
FIG. 2 is a control block diagram of a vehicle according to an exemplary embodiment of the disclosure.
Figure 3:
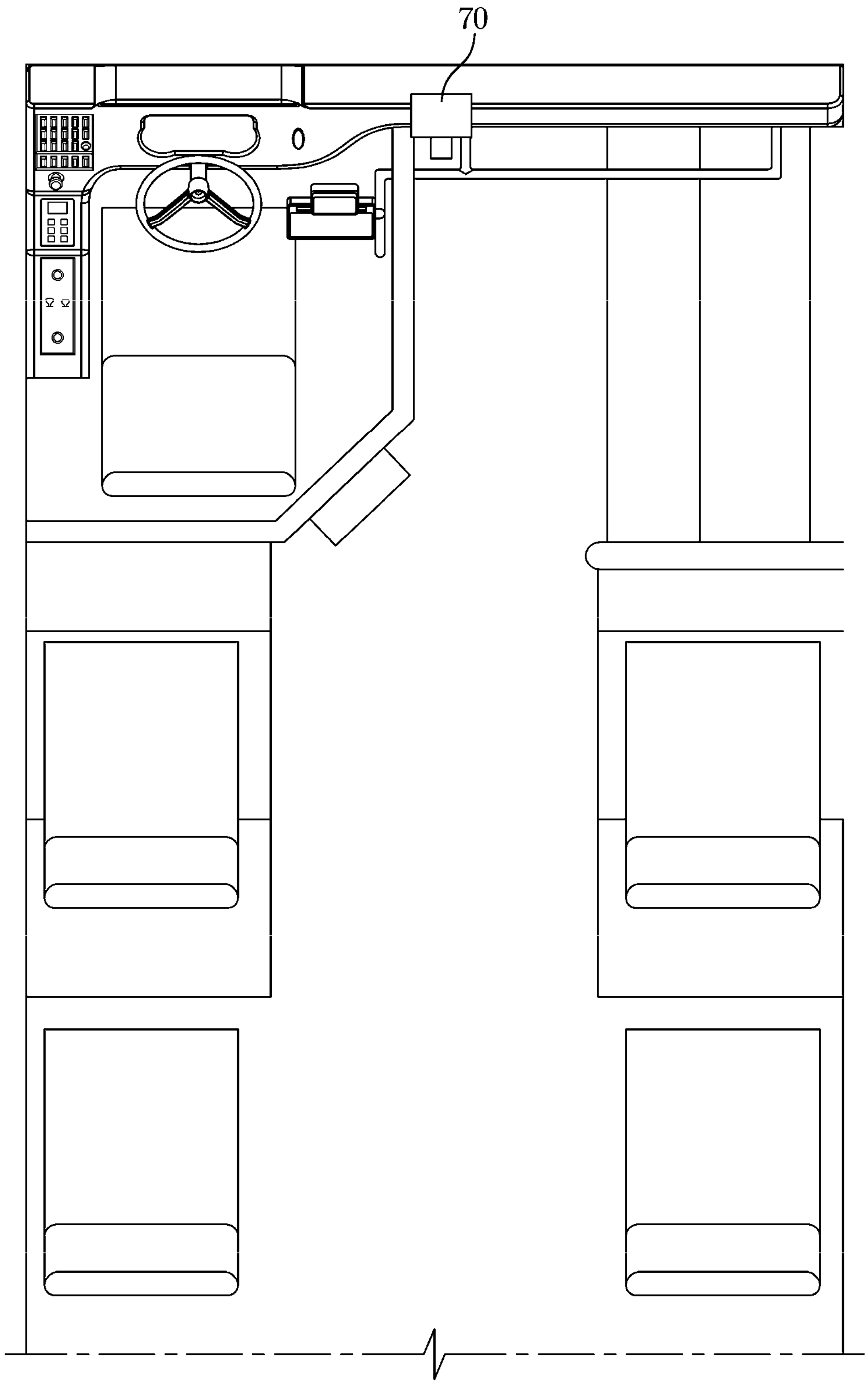
FIG. 3 is a view illustrating that a camera is provided in a vehicle according to an exemplary embodiment of the disclosure.
Figure 4:
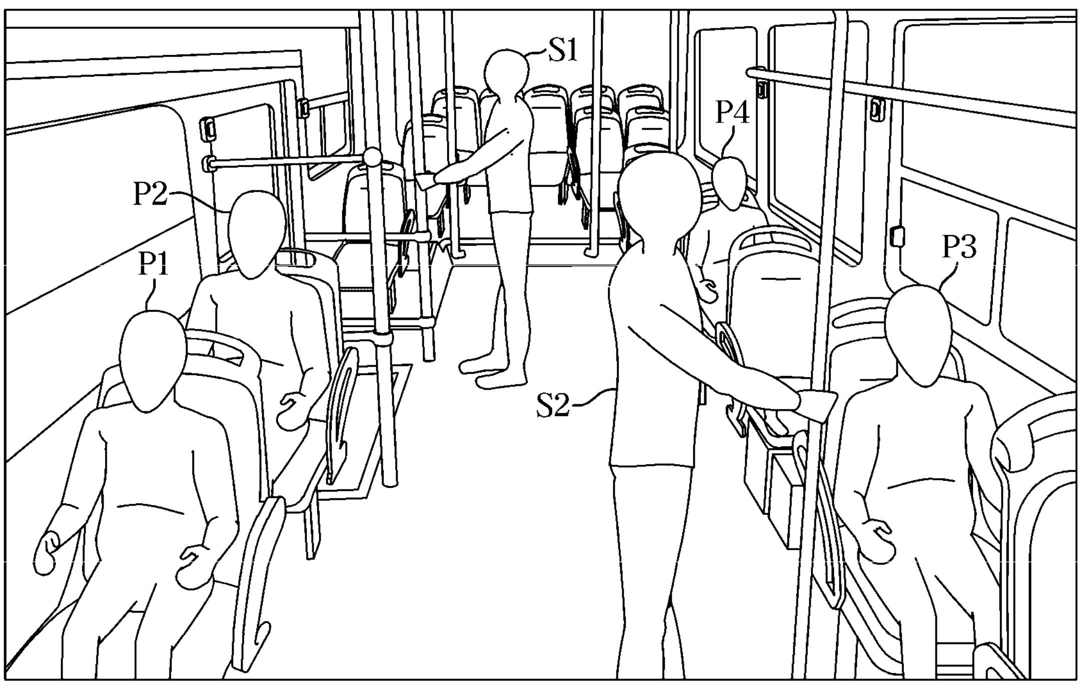
FIG. 4 is a view illustrating that passengers are boarding a vehicle in a standing or seated state.

FIG. 2 is a control block diagram of a vehicle according to an exemplary embodiment of the disclosure, FIG. 3 is a view illustrating that a camera is provided in a vehicle according to an exemplary embodiment of the disclosure, and FIG. 4 is a view illustrating that passengers are boarding in a vehicle in a standing or seated state.

Referring to FIG. 2, the bus 1 according to an exemplary embodiment of the disclosure includes a camera 70, a speed sensor 80, a storage 90, a controller 100, an indicator 110, and a detection sensor 200. The camera 70 may acquire the position information by capturing the passenger. The speed sensor 80 may detect a driving speed of the bus 1. The storage 90 may store data related to the control of the bus 1. The controller 100 may control components of the bus 1. The indicator 110 may be provided inside the bus 1 to visually indicate whether the passenger of the bus 1 can move within the bus 1. The detection sensor 200 may detect obstacles in the vicinity of the bus 1 and determine the driving environment.

The controller 100 may be a computer, a processor, a central processing unit, an electronic control unit, etc., and may control the functions of the camera 70, the speed sensor 80, the storage 90, the indicator 110, and the detection sensor 200.

The detection sensor 200 may include a proximity sensor, a radar sensor, an ultrasonic sensor, an infrared sensor, or the like.

The indicator 110 may be an output device such as a computer hardware converting information into human-readable form. Examples of the indicator 110 include Visual Display Units (VDU), a Monitor, Printer, Graphic Output devices, Plotters, Speakers, etc.

The storage 90 may be embodied as a digital storage, a storage media, a storage medium, or any hardware capable of holding information either temporarily or permanently. The storage 90 may include a ROM, RAM, a magnetic tape, a magnetic disc, flash memory, an optical data storage device, etc.

Referring to FIG. 3, the camera 70 may be provided inside the bus 1. The camera 70 may acquire image information by capturing the inside of the bus 1, and the acquired image information may be transferred to the controller 100.

In addition, the camera 70 may acquire the form and the position information of the passenger by capturing the passenger in the interior of the bus 1. As shown in FIG. 4, the passengers inside the bus may include the passengers P1 to P4 seated and the passengers S1 and S2 standing without sitting the seats.

The camera 70 may acquire the current position information of the passenger through image recognition and image analysis by capturing the passenger boarding the bus 1 in various ways, and additionally acquire image information for the boarding type of the passenger and transmit the image information to the controller 100.

In addition, the position information of the passenger acquired by the camera 70 may be stored in the storage 90, and the controller 100 may determine the behavioral stability on whether the current boarding state of the passenger is stable or unstable based on the position information of the passenger acquired by the camera 70.

In FIG. 3, the camera 70 is illustrated as being provided on a ceiling next to a driver's seat. However, the position at which the camera 70 is provided is not limited, and may be mounted at any position where the image information may be acquired by capturing the inside of the bus 1. In addition, the number of the cameras 70 provided in the bus 1 is also not limited.

The camera 70 may include at least one camera, and may further include an imaging sensor, a 3D spatial recognition sensor, a radar sensor, an ultrasonic sensor, and so forth in order to capture a more accurate image.

Figure 5A:
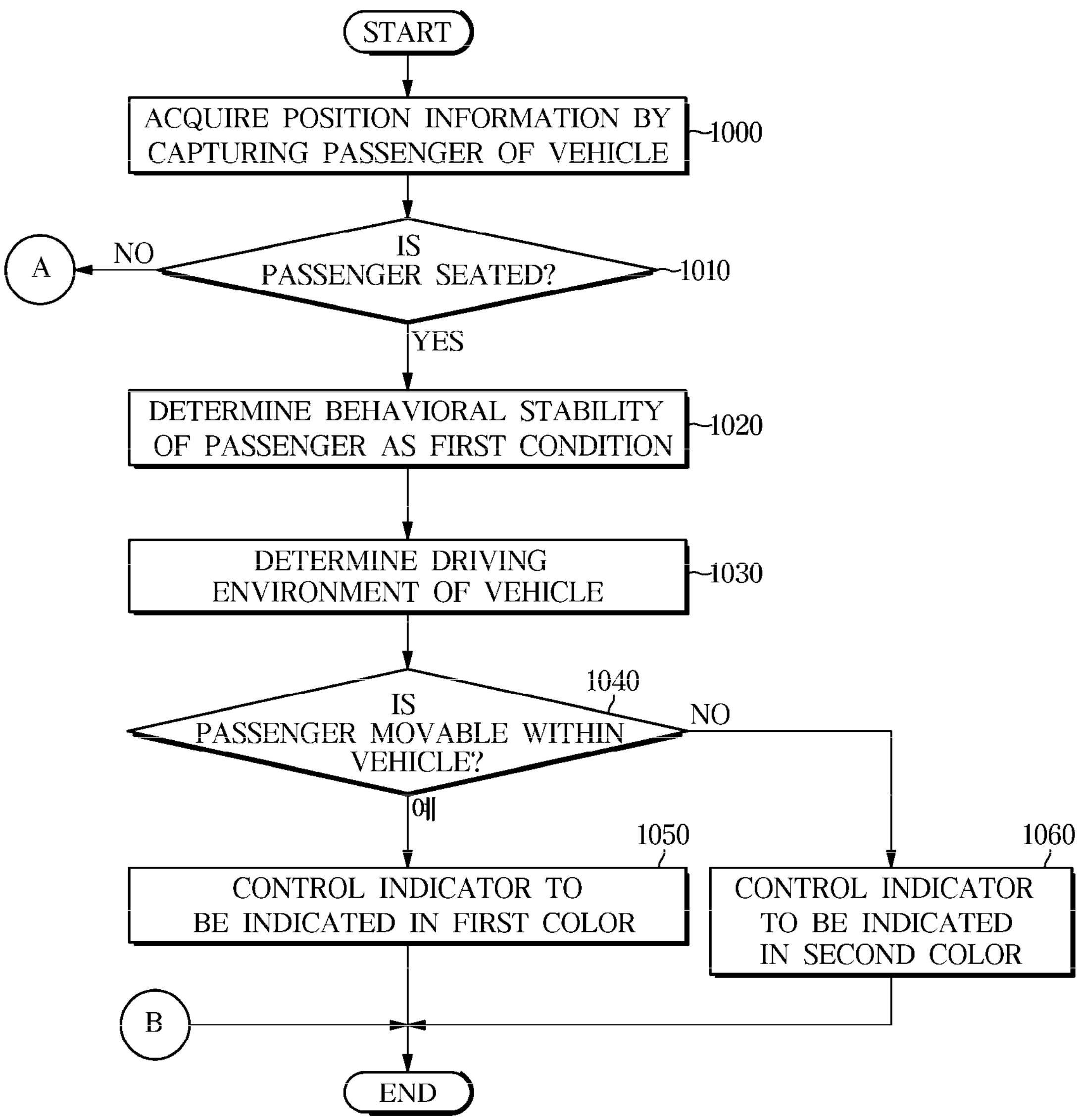
FIGS. 5A and 5B are a flowchart illustrating a method for controlling a vehicle according to an exemplary embodiment of the disclosure.
Figure 5B:
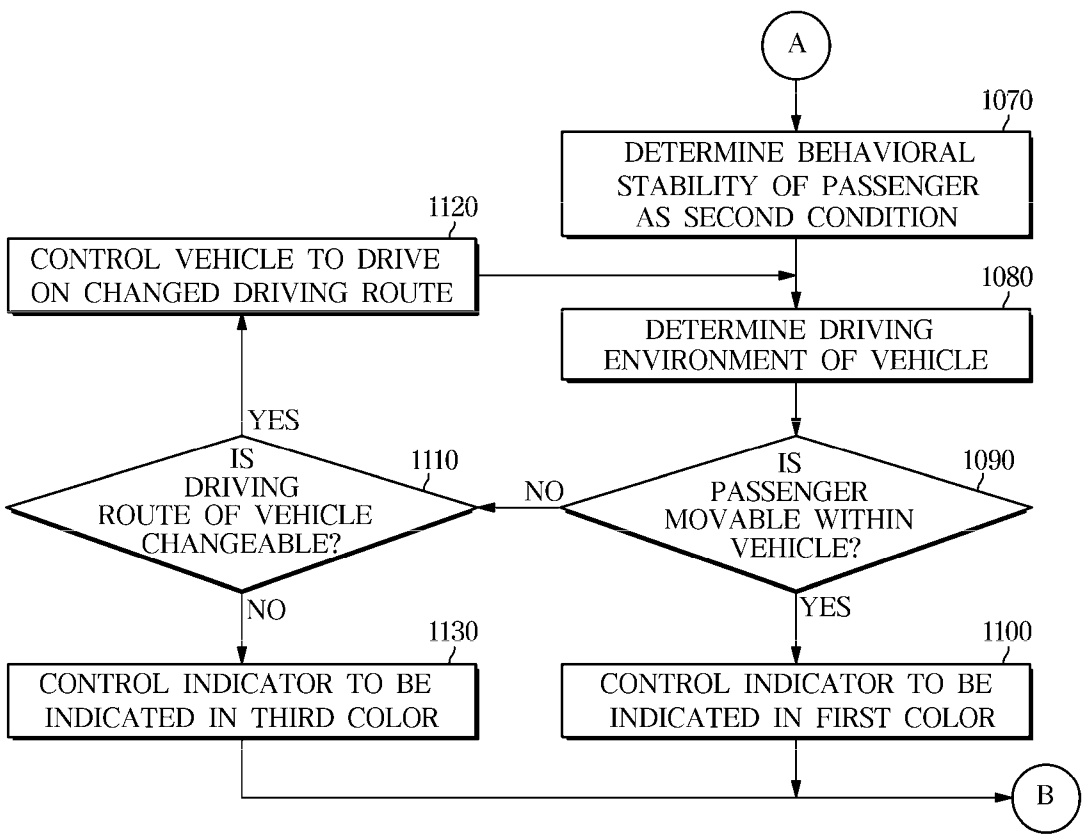
Figure 7:
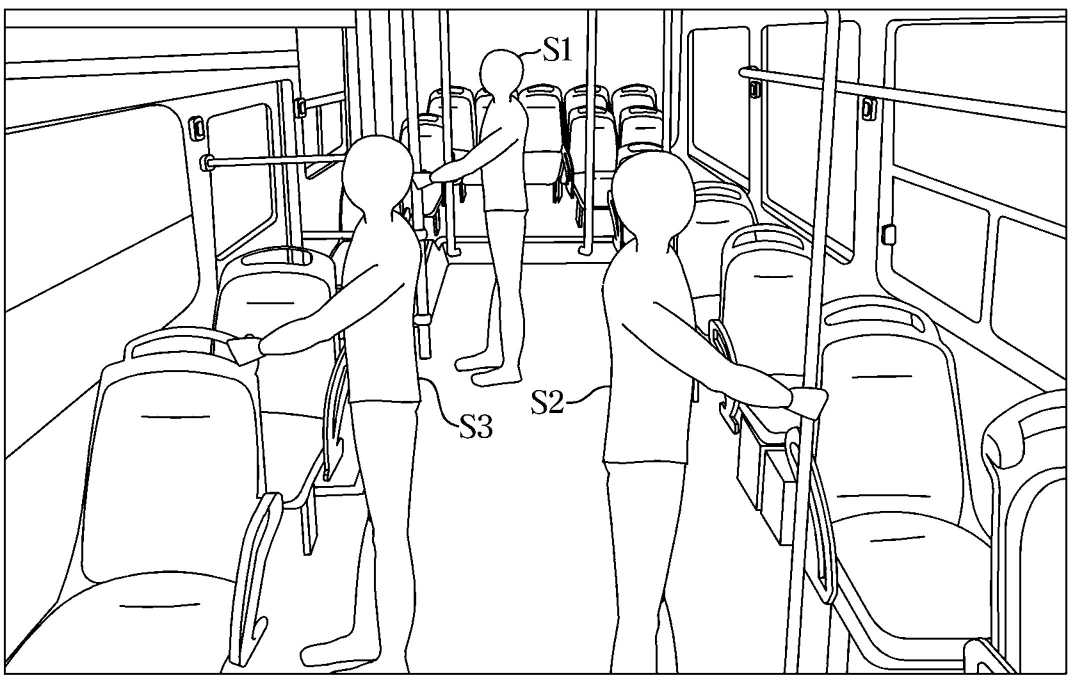
FIG. 7 is a view illustrating a state in which all passengers of a vehicle are standing without sitting in seats according to an exemplary embodiment of the disclosure.
Figure 8:
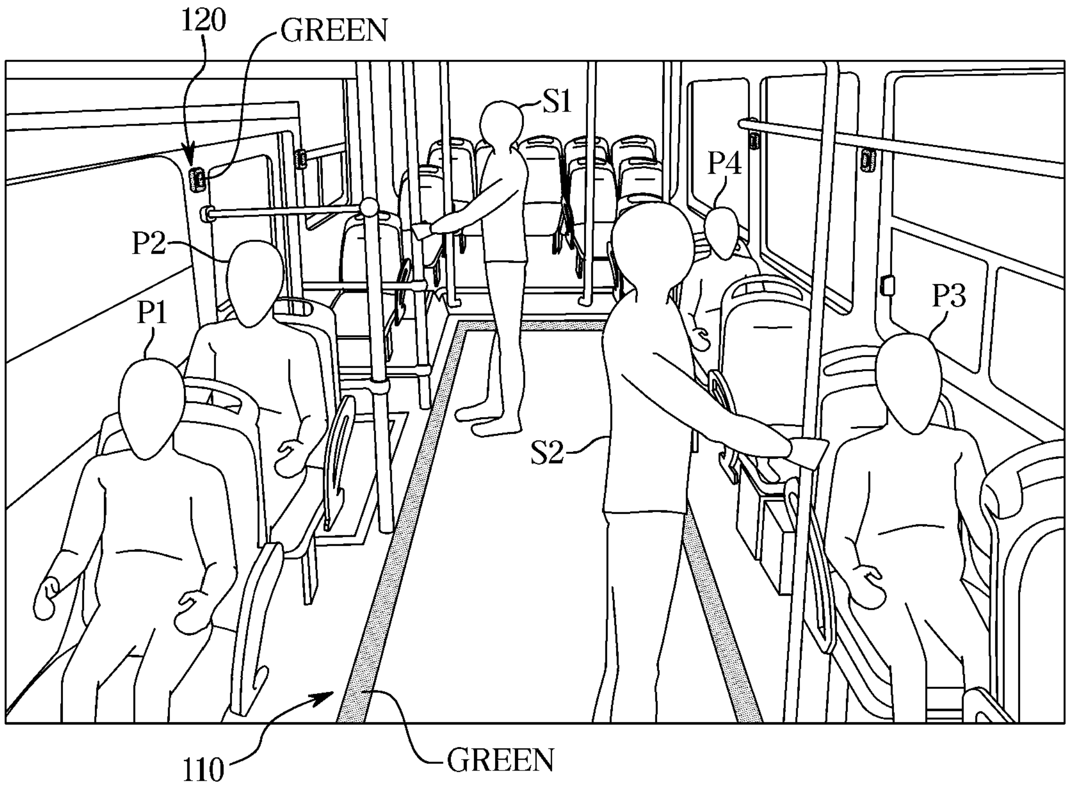
FIG. 8 is a view illustrating that an indicator is indicated in a first color according to behavioral stability of passenger and a driving environment of a vehicle according to an exemplary embodiment of the disclosure.
Figure 9:
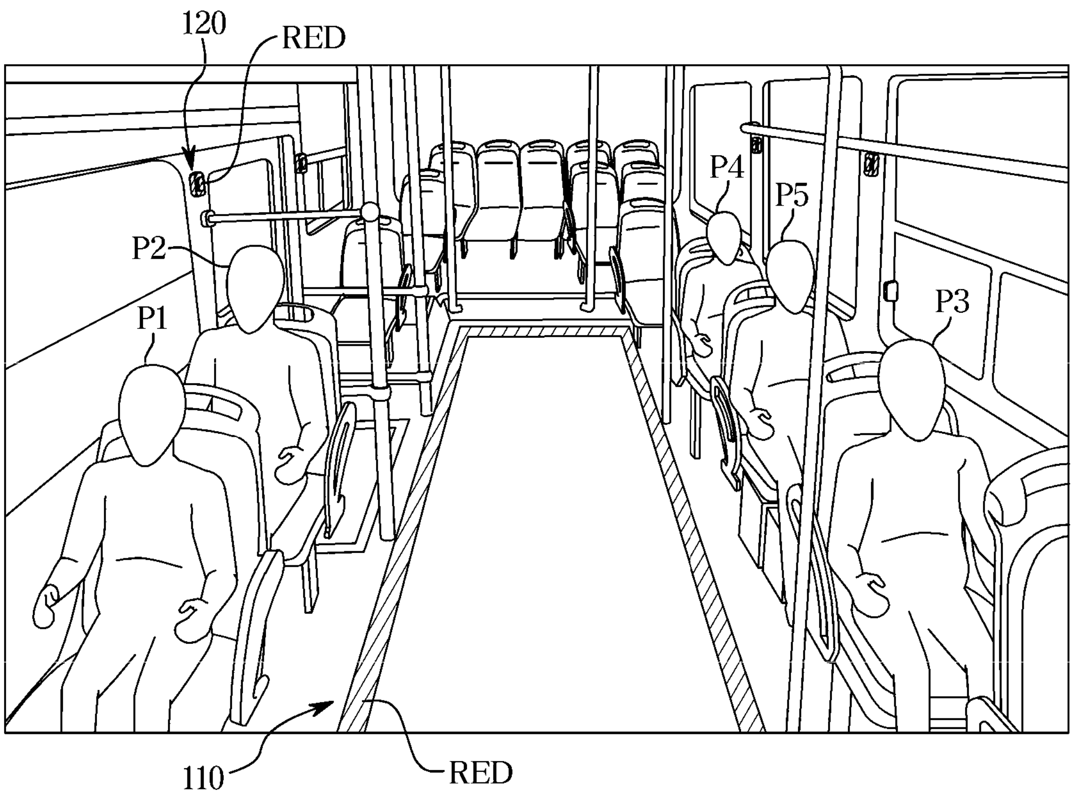
FIG. 9 is a view illustrating that an indicator is indicated in a second color according to behavioral stability of a passenger and a driving environment of a vehicle according to an exemplary embodiment of the disclosure.
Figure 10:
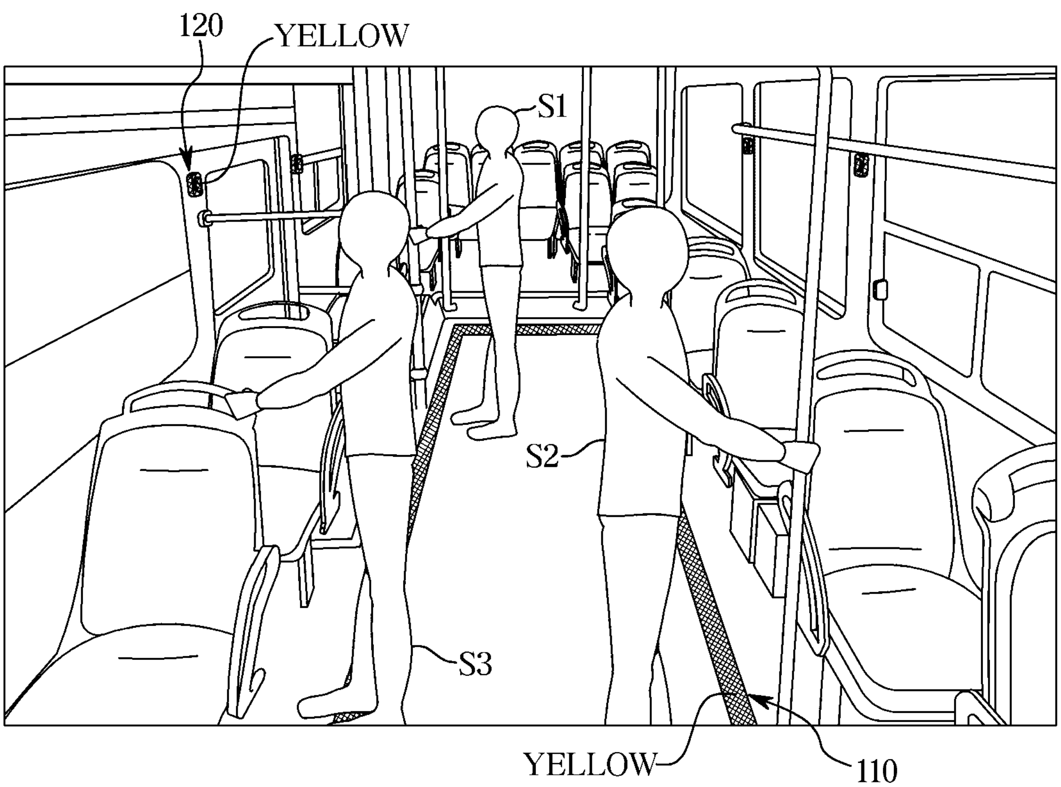
FIG. 10 is a view illustrating that an indicator is indicated in a third color according to behavioral stability of a passenger and a driving environment of a vehicle according to an exemplary embodiment of the disclosure.

The 3D spatial recognition sensor may be a KINECT (RGB-D sensor), a structured light sensor (TOF), a stereo camera, etc., but is not limited thereto, and may include other devices capable of similar functions. FIGS. 5A and 5B are a flowchart illustrating a method for controlling a vehicle according to an exemplary embodiment of the disclosure, FIG. 6 is a view illustrating a state in which all passengers of a vehicle are seated according to an exemplary embodiment of the disclosure, FIG. 7 is a view illustrating a state in which all passengers of a vehicle are standing without sitting in seats according to an exemplary embodiment of the disclosure, FIG. 8 is a view illustrating that an indicator is displayed in a first color according to behavioral stability of a passenger and a driving environment of a vehicle according to an exemplary embodiment of the disclosure, FIG. 9 is a view illustrating that an indicator is displayed in a second color according to behavioral stability of a passenger and a driving environment of a vehicle according to an exemplary embodiment of the disclosure, and FIG. 10 is a view illustrating that an indicator is displayed in the third color according to behavioral stability of a passenger and a driving environment of a vehicle according to an exemplary embodiment of the disclosure.

Referring to FIGS. 5A and 5B, the camera 70 according to an exemplary embodiment of the disclosure may acquire the position information of the passenger by capturing the passenger of the bus 1 (1000). In addition, as described above, the camera 70 may acquire information on the behavioral pattern of the passenger through the image recognition of the captured image and transmit the information to the controller 100.

Figure 6:
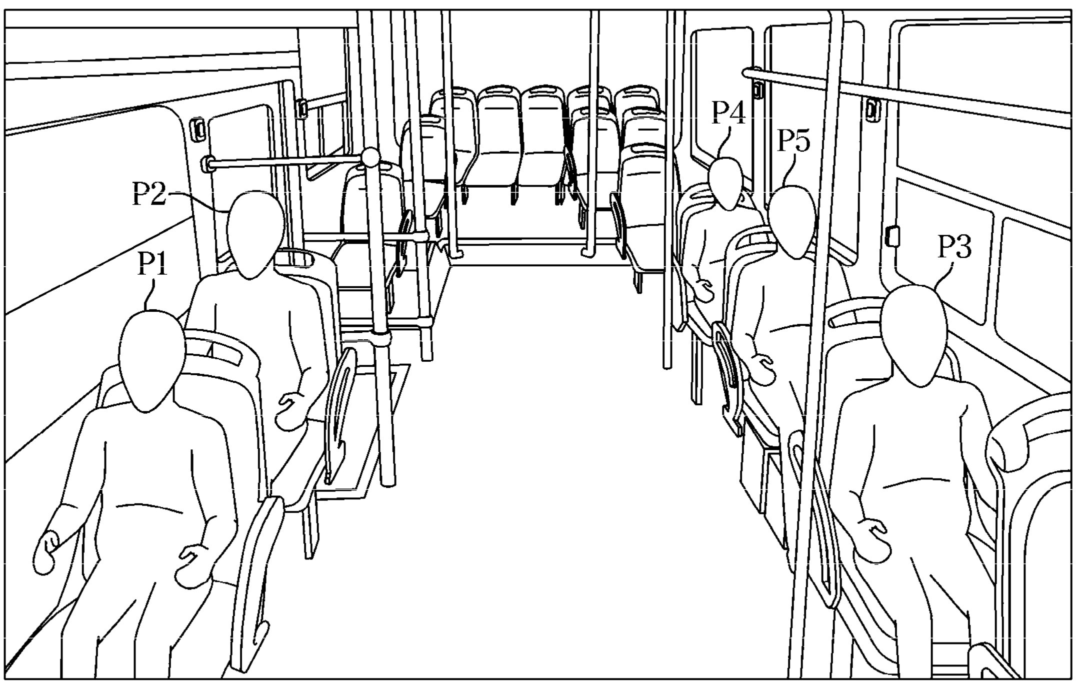
FIG. 6 is a view illustrating a state in which all passengers of a vehicle are seated according to an exemplary embodiment of the disclosure.

As illustrated in FIG. 6, when all of the passengers P1 to P5 of the bus 1 are seated, the camera 70 may acquire the position information of the passengers by capturing the passengers seated.

More specifically, the camera 70 may match the position of the passenger with the position of the seat of the bus 1 in the captured image, extract shape information and the position information of the passenger sitting in the seat, and transmit the shape information and the position information to the controller 100.

As shown in FIG. 7, when all of the passengers S1 to S3 of the bus 1 are in a standing state, the camera 70 may acquire the position information of the passengers by photographing the passengers in the standing state.

In detail, the camera 70 may match the position of the passenger with the position of the internal structure of the bus 1 in the captured image, extract shape information and the position information of the standing passenger, and transmit the information to the controller 100.

The controller 100 may determine whether the passenger is in a seated state or the standing state by receiving the position information and the shape information of the passenger from the camera 70 (1010).

The controller 100 may determine the behavioral stability of the passenger as a first condition higher than a predetermined reference when it is determined that the passengers are seated in the seat of the bus 1 based on the position information and the shape information of the passenger (1020). The controller 100 may determine the behavioral stability of the passenger as a second condition lower than a predetermined reference when it is determined that the passenger is standing within the bus 1 (1070).

That is, when the passenger is seated in the seat, even if the bus 1 is shaken or suddenly accelerated or rapidly decelerated, the behavior of the passenger can be secured to a certain degree, so that the controller 100 may determine the behavioral stability as the first condition higher than the predetermined reference. Here, the predetermined reference value for determining the behavioral stability is data stored in the storage 90 and corresponds to the reference value determined based on the seating state and the seating position of the passenger.

On the other hand, if the passenger is in the standing state without being seated, the behavior of the passenger may not be stably secured and may be in an unstable state, such as the passenger may fall when the bus 1 is shaken or suddenly accelerated or rapidly decelerated. Therefore, the controller 100 may determine the behavioral stability as the second condition lower than the predetermined reference.

The controller 100 may determine the driving environment of the bus 1 based on the information acquired by the detection sensor 200 and the speed sensor 80 (1030).

The detection sensor 200 may detect an obstacle around the bus 1 while the bus 1 is driving and determine the driving environment. In addition, a curvature of the road on which the bus 1 is driving or the shape of the structure installed on the road can be detected, and information on a pavement state of the road can also be acquired.

The speed sensor 80 may detect the driving speed of the bus 1 that is being driven. That is, the driving speed can be detected using the speed at which wheels of the bus 1 rotate. The unit of the driving speed may be represented by [kph], and may be represented by the distance (e.g. km) moved per unit time (e.g. 1 hour).

The driving environment of the bus 1 that is driving may include at least one of the driving route of the bus 1, the driving speed of the bus 1, climatic conditions at the time when the bus 1 is driving, and the state information of the road on which the bus 1 is driving.

The climatic conditions at the time when the bus 1 is driving may affect the road surface condition of the road on which the bus 1 is driving, and visibility of the detection sensor 200 of the driving bus 1.

In addition, the storage 90 may store map information including the driving routes for the bus 1 to drive, and the state information of the roads for the bus 1 to drive, and the driving route information acquired in real time while the bus 1 is driving.

Therefore, the controller 100 may determine whether it is not dangerous for the passengers to move in the bus 1 based on the driving environment of the bus 1.

In detail, the controller 100 may determine whether the driving speed of the bus 1 detected by the speed sensor 80 exceeds a predetermined value, and compare an acceleration or deceleration of the bus 1 with the predetermined value to determine the current driving environment of the bus 1.

In addition, the controller 100 may determine the current driving environment of the bus 1 by comparing the curvature of the road on the driving route of the bus 1 with the predetermined value.

The controller 100 may determine whether the passenger is movable in the bus 1 based on the previously determined behavioral stability of the passengers and the driving environment of the bus 1 (1040).

That is, the controller 100 may control the indicator 110 to be displayed in the first color when it is determined that the behavioral stability of the passenger is the first condition and the passenger is movable in the bus 1 based on the driving environment of the bus 1 (1050).

In detail, where the passenger is in the seated state, and in the case when the behavioral stability of the passenger is secured without the risk such as falling down even if the passenger moves within the bus 1 for changing the seats or getting off, in consideration of the driving environment such as the driving speed of the bus 1, the acceleration and deceleration of the bus 1, and the curvature of the road on which the bus is driving, the controller 100 may control the indicator 110 provided within the bus so that a green light is turned on and inform the passengers of whether he or she is movable within the vehicle.

As shown in FIGS. 8 to 10, the indicator 110 may be provided at the bottom of the bus 1 and may be implemented in the form of an LED lamp or an exit sign for evacuation. That is, the indicator 110 may be lit in a predetermined color under the control of the controller 100 to transmit stability information regarding the boarding of the bus 1 to the passenger.

The indicator 110 may be implemented differently from forms shown in FIGS. 8 to 10, and there is no limitation on the position at which the indicator 110 is provided. In addition, as shown in FIGS. 8 to 10, the indicator 110 may be implemented in the form of a get-off bell 120 provided in the bus 1. The get-off bell 120 may also operate as the indicator 110 by being turned on in the predetermined color under the control of the controller 100.

That is, as shown in FIG. 8, the passenger may determine that he or she is currently movable within the bus 1 by checking the indicator lit in the first color (e.g. green color). Therefore, the passenger who sits in the seats in the bus 1 can safely move within the bus 1.

In the case where the first color is turned on by controlling the indicator 110, the behavioral stability of the passengers in the seated state can be secured and the driving environment of the bus 1 is also in the stable state. Therefore, the controller 100 may additionally control a seat belt of the bus 1 to be released, and may control the sliding seat of the bus to be rotated or moved.

The controller 100 may control the indicator 110 to be displayed in the second color when it is determined that the behavioral stability of the passengers is the first condition and the passenger cannot move in the bus 1 based on the driving environment of the bus 1 (1060).

In detail, where the passenger is in the seated state, and in the case when the behavioral stability of the passenger is not secured with the risk such as falling down if the seated passenger move within the bus 1 for changing the seats or getting off, in consideration of the driving environment such as the driving speed of the bus 1, the acceleration and deceleration of the bus 1, and the curvature of the road on which the bus is driving, the controller 100 may control the indicator 110 provided within the bus so that a red light is turned on and inform the passenger of whether he or she cannot move within the vehicle.

That is, as shown in FIG. 9, the passenger may determine that he or she cannot currently move within the bus 1 by checking the indicator lit in the second color (e.g. red color). Therefore, the passenger who sits in the seat in the bus 1 may stay in the seated state in the seats without moving within the bus.

In the case where the second color is turned on by controlling the indicator 110, the behavioral stability of the passenger in the seated state cannot be secured and the driving environment of the bus 1 is also in the unstable state. Therefore, the controller 100 may additionally control the seat belt of the bus 1 not to be released, and may control the sliding seat of the bus not to be rotated or moved.

Referring back to FIGS. 5A and 5B, the controller 100 may determine the behavioral stability of the passenger as the second condition lower than the predetermined reference when the passenger is standing on the bus (1070). The controller 100 may determine the driving environment of the bus 1 based on the information acquired by the detection sensor 200 and the speed sensor 80 (1080).

The controller 100 may determine whether the passenger is movable within the bus 1 based on the behavior stability of the passenger and the driving environment of the bus 1 (1090).

That is, the controller 100 may control the indicator 110 to be displayed in the first color when it is determined that the behavioral stability of the passenger is the second condition and the passengers can move in the bus 1 based on the driving environment of the bus 1 (1100).

In detail, where the passenger is in the standing state, and in the case when the behavioral stability of the passenger is secured without the risk such as falling down even if the standing passenger moves within the bus 1 for changing the seats or getting off, in consideration of the driving environment such as the driving speed of the bus 1, the acceleration and deceleration of the bus 1, and the curvature of the road on which the bus is driving, the controller 100 may control the indicator 110 provided within the bus so that the green light is turned on and inform the passenger of whether he or she can move within the vehicle.

That is, as shown in FIG. 8, the passenger may determine that he or she can currently move within the bus 1 by checking the indicator lit in the first color (e.g. green color). Therefore, the passengers who stand in the bus 1 can safely move within the bus 1 to sit in the seats within the bus 1 or get off the bus 1.

In the case where the first color is turned on by controlling the indicator 110, the behavioral stability of the passenger in the standing state can be secured and the driving environment of the bus 1 is also in the stable state. Therefore, the controller 100 may additionally control the seat belt of the bus 1 to be released, and may control the sliding seat of the bus to be rotated or moved.

The controller 100 may determine whether the driving route of the bus 1 may be changed based on the driving map information of the bus 1 and the degree of congestion of the road, which are stored in the storage 90 when it is determined that the behavioral stability of the passenger is the second condition and the passenger cannot move within the bus 1 based on the driving environment of the bus 1 (1110).

In detail, where the passenger is in the standing state, and in the case when the behavioral stability of the passenger is secured without the risk such as falling down even if the standing passenger moves within the bus 1 for changing the seats or getting off, in consideration of the driving environment such as the driving speed of the bus 1, the acceleration and deceleration of the bus 1, and the curvature of the road on which the bus is driving, the controller 100 may secure the behavioral stability of the passenger by changing the driving route of the bus 1 that is driving autonomously or changing the behavior of the bus 1 that is driving.

That is, the controller 100 may determine whether the predetermined driving route of the bus 1 can be changed based on the position information of obstacles around the bus 1, the position information of another vehicle and the speed information of another vehicle acquired by the detection sensor 200.

The controller 100 may change the driving route of the bus 1 and control the bus to drive according to the changed driving route when it is determined that the behavioral stability of the passenger can be secured by changing the driving route of the bus 1.

On the other hand, the controller 100 may control the indicator 110 to be displayed in the third color when it is determined that another vehicle is driving on another driving route to be changed by the bus 1 or obstacles are located on another driving route therefor the driving route cannot be changed and the behavioral stability of the passenger cannot be secured.

Specifically, when the passenger is in the standing state and the driving route of the bus 1 cannot be changed for the stability of the passenger, the controller 100 may guide the standing passenger to sit in the seat by controlling the indicator 110 provided in the bus to turn on a yellow light.

That is, as shown in FIG. 10, the passenger may recognize that he or she must change from the current standing state to the seated state by checking the indicator 110 lit by the third color (e.g. yellow color).

In the case where the third color is turned on by controlling the indicator 110, the behavioral stability of the passenger in the standing state cannot be secured and the driving environment of the bus 1 is also in the unstable state. Therefore, the controller 100 may additionally control the seat belt of the bus 1 not to be released, and may control the sliding seat, which has been moved to the center passage side of the bus 1, to return to its original position.

Figure 11:
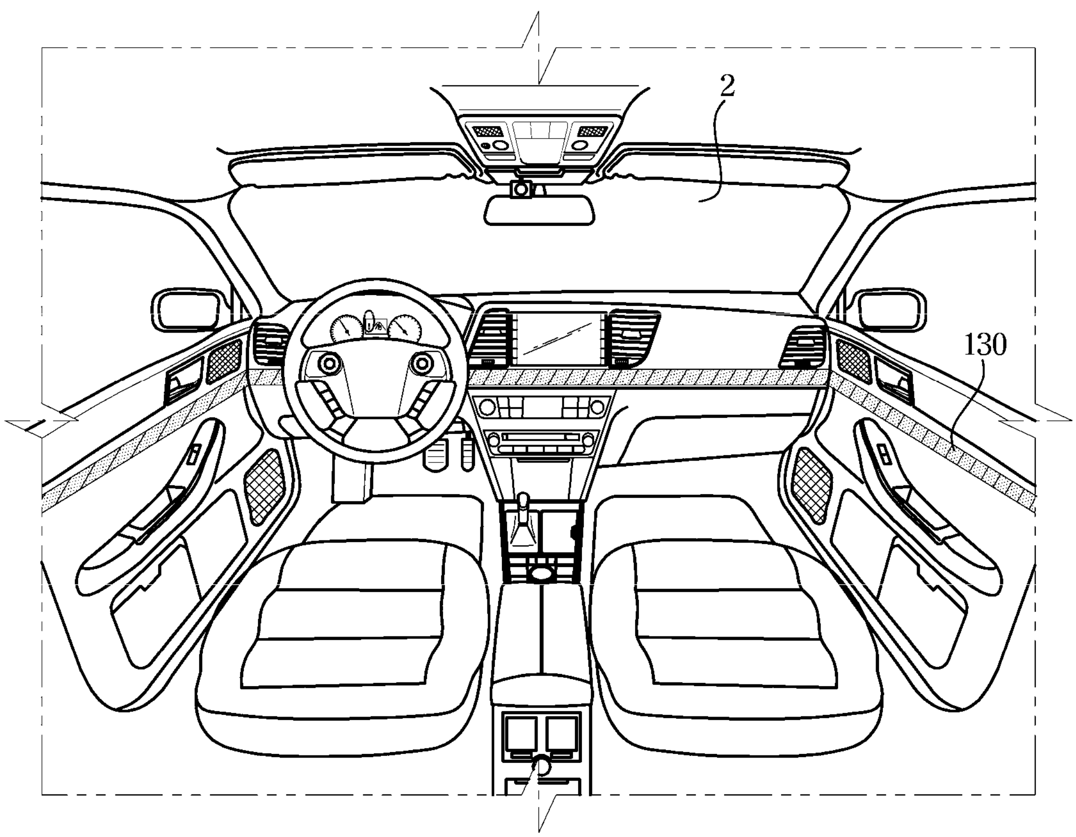
FIG. 11 is a view illustrating that an indicator provided in a vehicle is displayed in a predetermined color according to another exemplary embodiment of the disclosure.

FIG. 11 is a view illustrating that an indicator provided in a vehicle is displayed in a predetermined color according to another exemplary embodiment of the disclosure.

The vehicle and the method for controlling the same according to the above-described embodiment may be applied to the bus 1 capable of autonomous driving, but may also be applied to a general car 2 capable of autonomous driving.

As described in the above-described embodiment, the camera (not shown) provided in the car 2 may acquire the position information by capturing the passenger of the car 2.

The controller of the car 2 may determine the behavioral stability of the passenger based on the position information of the passenger, and determine whether the passenger is movable within the car 2, whether the seat of the car 2 can be moved, and whether the autonomous driving state should be released and changed to a driver driving mode based on the determined behavioral stability and the driving environment of the car 2.

The controller of the car 2 may differently control display forms of the indicator 130 provided in the car 2 based on the matters determined as described above.

That is, the controller of the car 2 may provide information regarding the movability of the passenger by controlling the indicator 130 to be turned on in the predetermined color based on the behavioral stability of the passenger and the driving environment of the car 2.

The principle of controlling the indicator 130 of the passenger car 2 to be turned on with the predetermined color is the same as the principle of controlling the indicator 110 provided in the bus 1 described with reference to FIGS. 1 to 10. Therefore, detailed description thereof will be omitted.

According to an aspect of the disclosure as described above, by notifying the time at which the passenger who is on board during the driving of the autonomous vehicle such as the bus 1 and the general car 2 is movable, it is possible to determine the time when the passenger is movable within the vehicle and prevent safety accidents. Furthermore, according to an aspect of the disclosure, by monitoring the position of passenger within the vehicle, the autonomous driving profile can be changed to prevent accidents.

The disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:

a camera configured to acquire position information of a passenger of the vehicle by capturing the passenger;

an indicator configured to indicate whether the passenger is movable within the vehicle; and a processor configured to:

determine behavioral stability of the passenger based on the acquired position information of the passenger, determine whether the passenger is movable within the vehicle based on the determined behavioral stability and driving environment of the vehicle; and control an indication type of the indicator differently depending on whether the passenger is movable.

2. The vehicle according to claim 1, wherein the processor is configured to:

determine the behavioral stability of the passenger as a first condition higher than a predetermined reference when it is determined that the passenger is seated in the vehicle based on the position information and shape information of the passenger, and determine the behavioral stability of the passenger as a second condition lower than the predetermined reference when it is determined that the passenger is standing in the vehicle.

3. The vehicle according to claim 2, wherein the driving environment of the vehicle includes at least one of a driving route of the vehicle, a driving speed of the vehicle, climatic conditions at the time the vehicle is driving, or state information of a road on which the vehicle is driving, and wherein the vehicle further comprises:

a storage configured to store map information including the driving route on which the vehicle is to be driving and the state information of the road on which the vehicle is to be driving, and information on the driving route acquired in real time while the vehicle is driving; and a speed sensor configured to detect the driving speed of the vehicle.

4. The vehicle according to claim 2, wherein the controller is configured to control the indicator to be indicated in a first color when it is determined that the behavioral stability of the passenger is the first condition and the passenger is movable within the vehicle based on the driving environment of the vehicle.

5. The vehicle according to claim 2, wherein the controller is configured to control the indicator to be indicated in a second color when it is determined that the behavioral stability of the passenger is the first condition and the passenger is not movable within the vehicle based on the driving environment of the vehicle.

6. The vehicle according to claim 2, wherein the controller is configured to control the indicator to be indicated in a first color when it is determined that the behavioral stability of the passenger is the second condition and the passenger is movable within the vehicle based on the driving environment of the vehicle.

7. The vehicle according to claim 2, wherein the controller is configured to control the indicator to be indicated in a third color when it is determined that the behavioral stability of the passenger is the second condition and the passenger is not movable within the vehicle based on the driving environment of the vehicle.

8. The vehicle according to claim 3, wherein the controller is configured to determine whether the driving route of the vehicle can be changed based on the map information and a congestion degree of the road on which the vehicle is driving when it is determined that the behavioral stability of the passenger is the second condition and the passenger is not movable within the vehicle based on the driving environment of the vehicle.

9. The vehicle according to claim 8, wherein the controller is configured to control the vehicle to drive on the changed driving route when the driving route of the vehicle can be changed, and to control the indicator to be indicated in a third color when the driving route of the vehicle cannot be changed.

10. The vehicle according to claim 8, further comprising a detection sensor configured to detect an object located around the vehicle, wherein the controller is configured to determine the congestion degree of the road on which the vehicle is driving based on at least one of position information or speed information of the object acquired by the detection sensor.

11. A method for controlling a vehicle that comprises an indicator for indicating whether a passenger of the vehicle is movable within the vehicle, the method comprising:

acquiring position information of the passenger by capturing the passenger;

determining behavioral stability of the passenger based on the acquired position information of the passenger;

determining whether the passenger is movable within the vehicle based on the determined behavioral stability and driving environment of the vehicle; and controlling an indication type of the indicator differently depending on whether the passenger is movable.

12. The method according to claim 11, wherein the determining behavioral stability of the passenger comprises:

determining the behavioral stability of the passenger as a first condition higher than a predetermined reference when it is determined that the passenger is seated in the vehicle based on the position information and shape information of the passenger; and determining the behavioral stability of the passenger as a second condition lower than the predetermined reference when it is determined that the passenger is standing in the vehicle.

13. The method according to claim 12, wherein the driving environment of the vehicle includes at least one of a driving route of the vehicle, a driving speed of the vehicle, climatic conditions at the time the vehicle is driving, or state information of a road on which the vehicle is driving, and wherein the method further comprises:

storing map information including the driving route on which the vehicle is to be driving and state information of the road on which the vehicle is to be driving, and information on the driving route acquired in real time while the vehicle is driving; and detecting the driving speed of the vehicle.

14. The method according to claim 12, wherein the controlling an indication type of the indicator comprises controlling the indicator to be indicated in a first color when it is determined that the behavioral stability of the passenger is the first condition and the passenger is movable within the vehicle based on the driving environment of the vehicle.

15. The method according to claim 12, wherein the controlling an indication type of the indicator comprises controlling the indicator to be indicated in a second color when it is determined that the behavioral stability of the passenger is the first condition and the passenger is not movable within the vehicle based on the driving environment of the vehicle.

16. The method according to claim 12, wherein the controlling an indication type of the indicator comprises controlling the indicator to be indicated in a first color when it is determined that the behavioral stability of the passenger is the second condition and the passenger is movable within the vehicle based on the driving environment of the vehicle.

17. The method according to claim 12, wherein the controlling an indication type of the indicator comprises controlling the indicator to be indicated in a third color when it is determined that the behavioral stability of the passenger is the second condition and the passenger is not movable within the vehicle based on the driving environment of the vehicle.

18. The method according to claim 13, further comprising determining whether the driving route of the vehicle can be changed based on the map information and a congestion degree of the road on which the vehicle is driving when it is determined that the behavioral stability of the passenger is the second condition and the passenger is not movable within the vehicle based on the driving environment of the vehicle.

19. The method according to claim 18, further comprising controlling the vehicle to drive on the changed driving route when the driving route of the vehicle can be changed; and controlling the indicator to be indicated in a third color when the driving route of the vehicle cannot be changed.

20. The method according to claim 18, further comprising:

detecting an object located around the vehicle; and determining the congestion degree of the road on which the vehicle is driving based on at least one of position information or speed information of the object.

* * * * *